(12) United States Patent  (10) Patent No.: US 9,384,197 B2
Ingrassia et al.  (45) Date of Patent: *Jul. 5, 2016

(54) AUTOMATIC DISCOVERY OF METADATA

(75) Inventors: Michael Ingrassia, San Jose, CA (US); Jeffery Lee, San Jose, CA (US); Dave Rempel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,279

(22) Filed: Feb. 27, 2012

(65) Prior Publication Data

US 2012/0158730 A1  Jun. 21, 2012

Related U.S. Application Data

(63) Continuation of application No. 12/722,327, filed on Mar. 11, 2010, now Pat. No. 8,140,570.

(51) Int. Cl.
*G06F 17/30* (2006.01)

(52) U.S. Cl.
CPC ............................... *G06F 17/30038* (2013.01)

(58) Field of Classification Search
None
See application file for complete search history.

(56) References Cited

U.S. PATENT DOCUMENTS

| 5,341,350 A | 8/1994 | Frank et al. |
| 5,483,261 A | 1/1996 | Yasutake |
| 5,488,204 A | 1/1996 | Mead et al. |
| 5,557,541 A | 9/1996 | Schulhof et al. |
| 5,825,352 A | 10/1998 | Bisset et al. |
| 5,835,079 A | 11/1998 | Shieh |
| 5,880,411 A | 3/1999 | Gillespie et al. |
| 5,983,073 A | 11/1999 | Ditzik |
| 6,047,054 A | 4/2000 | Bayless et al. |
| 6,160,551 A | 12/2000 | Naughton et al. |
| 6,188,391 B1 | 2/2001 | Seely et al. |
| 6,192,340 B1 | 2/2001 | Abecassis |

(Continued)

FOREIGN PATENT DOCUMENTS

| EP | 0744839 | 11/1996 |
| EP | 0898378 | 2/1999 |

(Continued)

OTHER PUBLICATIONS

Greenberg et al. Final Report for the AmeGA (Automatic Metadata Generation Applications) Project, University of North Carolina at Chapel Hill, 2005.

(Continued)

*Primary Examiner* — Hung Le
(74) *Attorney, Agent, or Firm* — Morrison & Foerster LLP

(57) ABSTRACT

This is directed to processing stored data to automatically generate metadata for the stored data. In particular, this is directed to identifying metadata associated with stored data, and identifying other data that relates to the stored data from one or more sources. A processing module can identify other data sharing some of the identified metadata, and can extract additional metadata associated with the identified other data. The extracted metadata can then be associated with the user's stored data. The processing module can extract additional metadata from any suitable source, including for example local application data, social networks or blogging sources, and other remote sources. In some embodiments, an electronic device can retrieve data from other users for a particular event based on metadata associated with the user's data for the event to form a master collection of data.

30 Claims, 10 Drawing Sheets

(56) References Cited

U.S. PATENT DOCUMENTS

| | | | |
|---|---|---|---|
| 6,255,961 | B1 | 7/2001 | Van Ryzin et al. |
| 6,259,892 | B1 | 7/2001 | Helferich |
| 6,310,610 | B1 | 10/2001 | Beaton et al. |
| 6,314,094 | B1 | 11/2001 | Boys |
| 6,323,846 | B1 | 11/2001 | Westerman et al. |
| 6,339,706 | B1 | 1/2002 | Tillgren et al. |
| 6,353,637 | B1 | 3/2002 | Mansour et al. |
| 6,401,085 | B1 | 6/2002 | Gershman et al. |
| 6,407,750 | B1 | 6/2002 | Gioscia et al. |
| 6,418,330 | B1 | 7/2002 | Lee |
| 6,487,663 | B1 | 11/2002 | Jaisimha et al. |
| 6,510,210 | B1 | 1/2003 | Baughan |
| 6,516,466 | B1 | 2/2003 | Jackson |
| 6,526,335 | B1 | 2/2003 | Treyz et al. |
| 6,559,773 | B1 | 5/2003 | Berry |
| 6,587,127 | B1 | 7/2003 | Leeke et al. |
| 6,658,247 | B1 | 12/2003 | Saito |
| 6,690,387 | B2 | 2/2004 | Zimmerman et al. |
| 6,728,531 | B1 | 4/2004 | Lee et al. |
| 6,772,212 | B1 | 8/2004 | Lau et al. |
| 6,823,225 | B1 | 11/2004 | Sass |
| 6,845,398 | B1 | 1/2005 | Galensky et al. |
| 6,901,067 | B1 | 5/2005 | Kalavade |
| 6,907,112 | B1 | 6/2005 | Guedalia et al. |
| 6,915,272 | B1 | 7/2005 | Zilliacus et al. |
| 6,917,923 | B1 | 7/2005 | Dimenstein |
| 6,973,299 | B2 | 12/2005 | Apfel |
| 7,015,894 | B2 | 3/2006 | Morohoshi |
| 7,058,220 | B2 | 6/2006 | Obrador |
| 7,065,342 | B1 | 6/2006 | Rolf |
| 7,131,059 | B2 | 10/2006 | Obrador |
| 7,184,064 | B2 | 2/2007 | Zimmerman et al. |
| 7,187,947 | B1 | 3/2007 | White et al. |
| 7,440,772 | B2 | 10/2008 | White et al. |
| 7,444,353 | B1 | 10/2008 | Chen et al. |
| 7,486,926 | B2 | 2/2009 | White et al. |
| 7,526,718 | B2 | 4/2009 | Samadani |
| 7,634,228 | B2 | 12/2009 | White et al. |
| 7,663,607 | B2 | 2/2010 | Hotelling et al. |
| 7,711,722 | B1* | 5/2010 | Sahasi .............. G06F 17/30056 707/705 |
| 7,739,304 | B2* | 6/2010 | Naaman et al. ............... 707/784 |
| 8,140,570 | B2 | 3/2012 | Ingrassia et al. |
| 8,290,929 | B2* | 10/2012 | Fisher et al. ................. 707/712 |
| 8,479,122 | B2 | 7/2013 | Hotelling et al. |
| 2002/0010759 | A1 | 1/2002 | Hitson et al. |
| 2002/0046084 | A1 | 4/2002 | Steele et al. |
| 2002/0164973 | A1 | 11/2002 | Janik et al. |
| 2004/0217884 | A1 | 11/2004 | Samadani et al. |
| 2004/0218894 | A1 | 11/2004 | Harville et al. |
| 2004/0218895 | A1 | 11/2004 | Samadani et al. |
| 2004/0220965 | A1 | 11/2004 | Harville et al. |
| 2006/0026521 | A1 | 2/2006 | Hotelling et al. |
| 2006/0197753 | A1 | 9/2006 | Hotelling |
| 2006/0242178 | A1 | 10/2006 | Butterfield et al. |
| 2007/0156726 | A1* | 7/2007 | Levy ............................ 707/100 |
| 2007/0271297 | A1* | 11/2007 | Jaffe ................ G06F 17/30041 |
| 2008/0066099 | A1* | 3/2008 | Brodersen et al. ............. 725/35 |
| 2008/0066100 | A1 | 3/2008 | Brodersen et al. |
| 2008/0162358 | A1 | 7/2008 | Patsiokas et al. |
| 2008/0195657 | A1* | 8/2008 | Naaman et al. ............ 707/104.1 |
| 2008/0229910 | A1* | 9/2008 | Kobayashi ........ G06F 17/30749 84/601 |
| 2008/0301084 | A1* | 12/2008 | Demarest et al. ................ 707/1 |
| 2008/0301099 | A1* | 12/2008 | Demarest .......................... 707/3 |
| 2009/0006285 | A1 | 1/2009 | Meek et al. |
| 2009/0063419 | A1* | 3/2009 | Nurminen et al. ................ 707/3 |
| 2009/0063975 | A1 | 3/2009 | Bull et al. |
| 2009/0070370 | A1 | 3/2009 | Cunningham et al. |
| 2009/0100068 | A1 | 4/2009 | Gauba et al. |
| 2009/0112839 | A1* | 4/2009 | Fisher et al. ....................... 707/5 |
| 2009/0125609 | A1 | 5/2009 | Wood et al. |
| 2009/0300008 | A1* | 12/2009 | Hangartner et al. .............. 707/5 |
| 2010/0088317 | A1* | 4/2010 | Bone ................ G06F 17/30144 707/737 |
| 2010/0131505 | A1* | 5/2010 | Erickson ........... G06F 17/30867 707/736 |
| 2010/0161629 | A1 | 6/2010 | Palanisamy et al. |
| 2010/0191728 | A1* | 7/2010 | Reilly et al. .................. 707/736 |
| 2011/0004608 | A1* | 1/2011 | Solaro et al. .................. 707/759 |
| 2011/0145305 | A1* | 6/2011 | Kamei et al. .................. 707/822 |
| 2011/0191287 | A1* | 8/2011 | Spears .......................... 707/609 |
| 2011/0225178 | A1* | 9/2011 | Ingrassia ........... G06F 17/30038 707/769 |
| 2012/0317110 | A1* | 12/2012 | Butterfield et al. ........... 707/734 |
| 2013/0011062 | A1* | 1/2013 | Conwell et al. ............... 382/173 |
| 2013/0198242 | A1* | 8/2013 | Levy ............................ 707/803 |
| 2014/0195449 | A1* | 7/2014 | Komissarchik ... G06F 17/30719 705/319 |

FOREIGN PATENT DOCUMENTS

| | | |
|---|---|---|
| EP | 0918408 | 5/1999 |
| JP | 8-006875 | 1/1996 |
| JP | 11-164058 | 6/1999 |
| JP | 11-242686 | 9/1999 |
| JP | 11-317061 | 11/1999 |
| JP | 2000-163031 A | 6/2000 |
| JP | 2002-342033 A | 11/2002 |
| KR | 1999-0073234 | 10/1999 |
| WO | 00/54462 | 9/2000 |
| WO | 2007/144030 | 12/2007 |

OTHER PUBLICATIONS

Greenberg, J. (2004). "Metadata Extraction and Harvesting: A Comparison of Two Automatic Metadata Generation Applications," Journal of Internet Cataloging.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Mori et al. "Keyword Extraction from the Web for Personal Metadata Annotation," University of Tokyo, Japan, 2004.

Notice of Allowance mailed Nov. 9, 2011, for U.S. Appl. No. 12/722,327, filed Mar. 11, 2010, 11 pages.

Rodriguez et al. "Automatice Metadata Generation Using Associative Networks," ACM, 2009.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Lee on Kee, "Automatic Tag Recommendation for the Web2.0 Blogosphere" City University of Hong Kong, Department of Computer Science, Jun. 2008, pp. 1-105.

Marek Lipczak, "Tag Recommendation for Folksonomies Oriented towards Individual Users" Dalhousie University, Faculty of Computer Science, 2008, pp. 1-12.

Orubeondo, "Trim AirCard 300 Eases Power Demands." InfoWorld vol. 21, Issue 48, pp. 46 & 50, Nov. 29, 1999.

"Sierra Wireless Announces First Cellular Network Interface Card for Notebook PCs; The AirCard 300 for Windows Changes the Way Notebook PC Users Make Wireless Connections." Business Wire, Jun. 21, 1999 (http://findarticles.com/p/articles/mi_m0EIN/is_1999_June_21/ai_54937451/), retrieved Aug. 5, 2009.

Cellular for Notebook PCs. CIO vol. 13, No. 1, Section 1, p. 90, Oct. 1, 1999.

"Briefs: Sierra Wireless . . . " NetworkWorld vol. 16, No. 34, p. 27, Aug. 23, 1999.

"Specification of the Bluetooth System, vol. 1." pp. 1-1080, Nov. 29, 1999.

"Specification of the Bluetooth System, vol. 2." pp. 1-438, Nov. 29, 1999.

(56) References Cited

OTHER PUBLICATIONS

"Digital Cellular Telecommunications System (Phase 2+); General Packet Radio Service (GPRS); Overall Description of the GPRS Radio Interface; Stage 2 (GSM 03.64 version 6.0.1 Release 1997)" pp. 1-56, Aug. 1998.

"Digital Cellular Telecommunications System (Phase 2+); General Packet Radio Service (GPRS); Overall Description of the GPRS Radio Interface; Stage 2 (GSM 03.64 version 6.1.0 Release 1997)" pp. 1-42, Oct. 1998.

"Digital Cellular Telecommunications System (Phase 2+); General Packet Radio Service (GPRS); Overall Description of the GPRS Radio Interface; Stage 2 (GSM 03.64 version 6.2.0 Release 1997)" pp. 1-42, May 1999.

"Digital Cellular Telecommunications System (Phase 2+); General Packet Radio Service (GPRS); Overall Description of the GPRS Radio Interface; Stage 2 (GSM 03.64 version 6.3.0 Release 1997)" pp. 1-42, Jul. 1999.

"Digital Cellular Telecommunications System (Phase 2+); General Packet Radio Service (GPRS); Overall Description of the GPRS Radio Interface; Stage 2 (GSM 03.64 version 7.0.0 Release 1997)" pp. 1-41, Jul. 1999.

Cai et al. "General Packet Radio Service in GSM." IEEE Communications Magazine, Oct. 1997, pp. 122-131.

"Part 11: Wireless LAN Medium Access Control (MAC) and Physical Layer (PHY) Specifications." IEEE Std 802.11-1997, pp. 1-445.

Lind et al. "The Network Vehicle—A Glimpse into the Future of Mobile Multi-Media." IEEE, pp. I21-1-I21-8, 1998.

Nokia Quick Guide, Accessories Guide, pp. 1-31, 1999.

Nokia 9110i User's Manual, pp. 1-190, 1999.

Qualcomm QCP—1960™, Sprint PCS User Guide, pp. 1-76, Apr. 1999.

Samsung Model SCH-3500, Sprint PCS User Guide, pp. 1-108, 1999.

StarTAC, Sprint PCS User Guide, pp. 1-118, Mar. 1999.

Visteon: For Your Listening Pleasure—Any Music, Any Time, Anwhere (http://www2.prnewswire.com/cgi-bin/stories.pl?ACCT=104&STORY=/www/story/01-05-2000/0001107812&DATE ), originally retrieved Jan. 5, 2000.

\* cited by examiner

FIG. 2

| Field | Metadata |
|---|---|
| Event | Joe's birthday |
| Location | Golden Gate Park |
| People | |
| Time | 12:43PM |
| Motion | 0.12, 0.56, 2.82 |
| Color palette | |
| ... | ... |
| Sensor-based | |

FIG. 3

Essential Metadata
Movie data

| | |
|---|---|
| Event | On |
| Location | On |
| Orientation | Off |
| People | On |
| Colors | Off |
| Motion | Off |
| Description | Off |
| Tag 1 | On |

AUTOMATIC DISCOVERY OF METADATA

This application is a continuation of U.S. patent application Ser. No. 12/722,327 filed Mar. 11, 2010, the contents of which are incorporated herein by reference.

BACKGROUND

This is directed to tagging stored data, such as media, with automatically discovered metadata. Metadata can be automatically discovered based on known or available metadata for the stored data by identifying other data also associated with the known metadata.

Electronic devices can generate, capture, store or access different types of data. For example, an electronic device can be used to generate files containing different types of information (e.g., media files, data files, documents, spreadsheets, or presentations). To assist the user in classifying or organizing the data, or to assist the user or others in searching for the data (e.g., if the data is later stored in a remote location), different metadata can be associated with the data. The metadata can include, for example, information providing the identity of the user generating or editing the data, the content of the data, the location or time at which the data was generated to edited, user-defined tags, or other attributes of the data.

Different metadata can be associated with stored data using any suitable approach. In some embodiments, some metadata can automatically be associated with data when the data is initially generated. For example, metadata associated with an application used to generate the data, the person owning a license to use the application, the date and time at which the application was used, various settings describing the format of the data (e.g., the font and paragraph information of a text document), or an Internet address of a device used to generate the data can be automatically generated and associated with the data by the device used to generate the data. In some embodiments, metadata can be associated with stored data at a later time. For example, metadata providing a time stamp, the identity of a user editing data, a listing of changes made by a particular user, or other such metadata can be automatically associated with stored data when the data is accessed or edited.

In some embodiments, a user can instead or in addition manually modify metadata associated with stored data. For example, a user can access a menu or display associated with the stored data, and remove, add, or change metadata listed in the menu. In some cases, a user can add a new metadata field. As another example, a user can remove all metadata associated with data prior to sending the data to another user (e.g., scrub a file before sending it via email). As still another example, a user can select several data files, and simultaneously change the metadata for the collection of data files (e.g., so that they all have the same or different metadata).

When an electronic device automatically associates metadata with a media item, however, the electronic device may only be able to provide metadata for a limited number of fields. In particular, the specific metadata automatically provided for stored data can be constrained by the capabilities of the electronic device generating the data. For example, a device that does not include positioning circuitry may not be able to provide location-based metadata. As another example, an electronic device that does not include a clock may not be able to provide time stamp metadata.

SUMMARY

This is directed to automatically identifying metadata to apply to stored data. In particular, this is directed to discovering other data sharing characteristics with the stored data, and applying metadata of the other data to the stored data.

An electronic device can generate or access data for a user. To assist the user in classifying and managing the data, the data can be associated with metadata. While some metadata can be automatically associated with the data when the data is initially generated (e.g., when an image is captured), some metadata may be typically added manually, which can be a burdensome task.

To automate the metadata association process, a processing module can review the initial metadata associated with data, and identify other information related to the initial metadata. For example, a processing module can review data used by applications of an electronic device, and extract metadata from the application data. In particular, a processing module can retrieve event information from a calendar, and apply metadata extracted from the event information to data having a time stamp corresponding to the event time.

In some embodiments, the processing module can identify entries in one or more social networks that relate to the data. For example, the processing module can identify social network streams associated with the user accessing the data, or with friends of the user accessing the data and extract metadata from the social network streams. In particular, the processing module can identify people who could be in the data content (e.g., event attendees), the event location, or any other metadata that can be extracted from the social network streams. In some embodiments, the processing module can instead or in addition search for data from remote sources as a whole (e.g., search some or all of the Internet), and extract additional metadata from the search data that shares at least some metadata with the user's data.

In some embodiments, the electronic device can instead start from the user's data, and search a social network or a larger remote source (e.g., the internet) for some or all of the data that corresponds to the user's data. For example, the electronic device can identify the particular set of metadata associated with the user's data, and search for other data that shares some or all of the metadata with the user's data.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 2 is a schematic view of illustrative metadata associated with data in accordance with one embodiment of the invention;

FIG. 3 is a schematic view of an illustrative interface for defining a set of essential metadata fields in accordance with one embodiment of the invention;

DETAILED DESCRIPTION

An electronic device can be operative to generate or receive data. The data can include, for example, text, numbers, spreadsheets, presentations, images, audio, video, or combinations of these. For example, the data can include media stored or accessed by the device. In particular, media can include images, photographs, video, voice or audio recordings, text (e.g., blogging or micro-blogging streams), location streams, or combinations of these. For the simplicity of the following discussion, however, different embodiments of the invention will be described in the context of the management of media and the association of metadata to the media.

As electronic devices become more adept at capturing media, as purchasing media becomes easier, and as remote sources of media become easily accessible, many users can find that they have access to or manage a large media library. To enhance the users' ability to navigate through, locate, and share specific media items, many users use metadata to tag and classify the media items. It may be difficult and time consuming, however to individually or collectively tag different media items by hand. Some metadata can be automatically associated with media items by the device used to generate the media item or by a device used to view the media item. For example, some metadata can be identified based on the output of sensors associated with the device used to generate the media item. Such metadata can include, for example, location, orientation, time, temperature, or vibration/movement metadata. Other metadata can include, for example, metadata retrieved from the content of the media item. Such metadata can include, for example, color, texture, face detection, image recognition output, and voice recognition metadata.

This metadata, however, is limited or restricted by the sensors available to the device, and the information known to the device about the user's library (e.g., who a particular detected face is, or whose voice is selected). The provided metadata can therefore be enhanced by augmenting it with additional metadata from remote sources (e.g., cloud-based sources). In addition, metadata tags retrieved from remote sources can be prioritized such that only a subset of metadata identified from a remote source is selected, where the remotely identified metadata most closely matches the specific metadata that a user would provide for media in the user's library.

Figure 1:
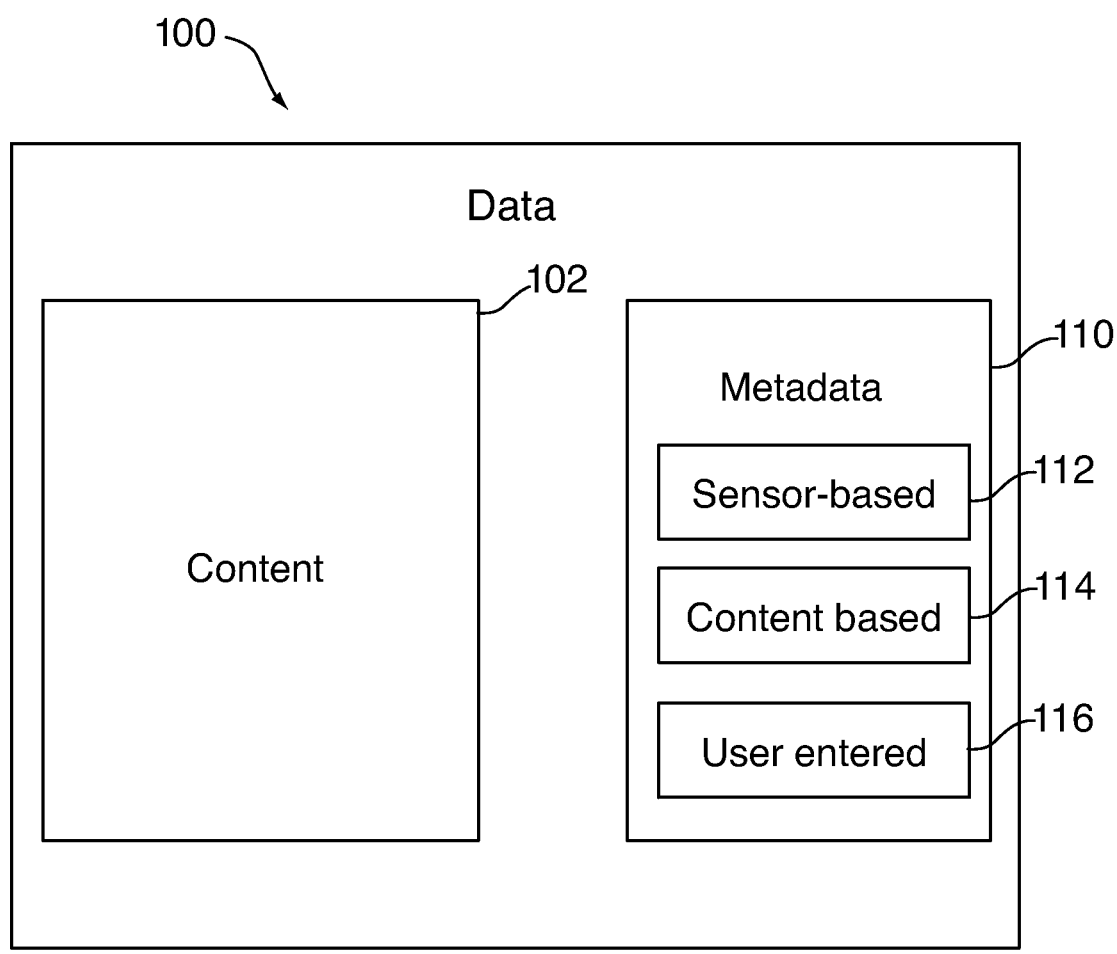
FIG. 1 is a schematic view of illustrative data that can be generated, accessed, or edited by an electronic device in accordance with one embodiment of the invention.

FIG. 1 is a schematic view of illustrative data that can be generated, accessed, or edited by an electronic device in accordance with one embodiment of the invention. Data 100 can include content 102 and metadata 110 associated with the data. Data 100 can include any suitable type of data, including for example text, numerical, image, video, audio, or combinations of these. In one implementation, data 100 can include media played back by a device, or media captured by a device. Content 102 can include image, video or audio tracks that can be played back separately or simultaneously, or can be edited or modified independently or simultaneously. Each track can be encoded using any suitable approach, including for example using primary frames (e.g., I-frames) and secondary frames (e.g., P or B-frames), or a sequence of full frames (e.g., individual audio sequences).

To provide a complete and functional classification system, data 100 can be associated with different metadata 110 that can be catalogued, indexed, and searched. Metadata 110 can be associated with content 102 using any suitable approach. For example, metadata can be stored as part of data 100 that includes the content (e.g., metadata 110 forms a header in a file). As another example, metadata 110 can be stored in a separate location from the content. In particular, metadata 110 can be stored in a metadata file (e.g., one file for each instance of content), a database (e.g., metadata database within an electronic device or within a particular application), remote location (e.g., a remote server), or any other suitable location. If the metadata is stored separately from the content, the metadata can be associated with the content using any suitable approach, including for example one or more references in the metadata and/or content, pointers, links, or other combinations of these.

Metadata 110 can include any suitable type of metadata. For example, metadata 110 can include sensor-derived metadata 112. Such metadata can include, for example, the output of one or more sensors or sensing mechanisms of an electronic device used to capture or generate the data (e.g., the media). The sensors can include, for example, motion detection components (e.g., an accelerometer), location sensing components (e.g., GPS or cellular tower-triangulation circuitry), cameras (e.g., or other image capturing sensors), clock, or combinations of these.

In some embodiments, metadata 110 can instead or in addition include content-based metadata 114. For example, an electronic device can analyze the content of data, and extract attributes of the content. Such metadata can include, for example, color analysis or profile, voice recognition outputs, facial recognition outputs, object recognition outputs, information describing landmarks in the data, stabilization information, or any other information extracted from the content of the data (e.g., the media content). The content-based metadata can be generated at any suitable time and using any suitable device. For example, some content-based metadata can be generated after post-processing data (e.g., using a device used to access the data) and later associated with the data. In some cases, the electronic device generating the data can analyze data as it is captured to extract content-based metadata.

In some embodiments, metadata 110 can instead or in addition include metadata entered or defined by the user. For example, a user can add metadata in one or more fields associated with data. As another example, a user can modify an automatically generated metadata field. The user can enter any suitable metadata for stored data, including for example tags or notes of interest or use only to the user (e.g., a "print these" tag for pictures, or "process" tag for media that has been captured but not yet reviewed or sorted).

When an electronic device accesses data, the electronic device can review the metadata associated with the data. For example, the electronic device can identify the types of metadata that are associated with data by determining the categories or fields of metadata for which metadata is available. In some embodiments, it may be desirable to have metadata in at least a threshold or minimum set of metadata categories. For example, it may be desirable to include metadata depicting the location or people shown in an image or video. As another example, it may be desirable to include metadata used for classifying the data (e.g., location, people, event, or timing metadata). FIG. 2 is a schematic view of illustrative metadata associated with data in accordance with one embodiment of the invention. Metadata structure 200 can include different categories of metadata. For example, metadata structure 200 can include categories or fields of metadata 210 and corresponding metadata 240 associated with some or all of the fields.

Any suitable field can be provided in fields 210. For example, structure 200 can include event field 212, location field 214, people field 216, and time field 218. In addition, structure 200 can include motion field 220, color palette field 222, and tag field 226. Structure 200 can have any suitable number of fields, including for example more fields than shown (e.g., as depicted by dots 224). Structure 200 can include metadata in column 240 in which metadata can be stored for some or all of fields 210. In the example of structure 200, metadata may be available for metadata blocks 242, 244, 248 and 250, but not available for blocks 246, 252 and 256 corresponding to fields 210 to 226, respectively.

Any suitable information can be stored as metadata 240. For example, individual metadata can include text (e.g., one or more words), numbers, images or icons, links to other information (e.g., hyperlinks), or any other suitable information. In some embodiments, metadata can be formatted in a manner corresponding to the field. For example, metadata related to location can be provided as coordinates (e.g., latitude and longitude), a GPS input, an address, or a landmark. As another example, motion metadata can be provided as the raw output of an accelerometer (e.g., a voltage along three different axes), a measure of acceleration (e.g., in N/m² or G), or as a threshold value indicating the orientation of the device (e.g., portrait or landscape). In some embodiments, metadata can include several distinct instances of information corresponding to a particular field (e.g., a list of people or landmarks in an image).

In some embodiments, a subset of fields 210 can be identified as more important or more relevant to the user. For example, the fields of set 230 (with bold outlines) can be identified as a minimum set of fields for which metadata is to be provided for a user to have a suitable experience interacting with the data. The particular fields of set 230 can be defined using any suitable approach. For example, the fields can be automatically selected by a particular electronic device, or for a particular type of data. In one implementation, different sets of metadata (e.g., different fields) can be selected as part of a minimum or essential set for different types of data (e.g., different metadata for media and for text documents). In some embodiments, a user can define the particular set of metadata that is most important for stored data. FIG. 3 is a schematic view of an illustrative interface for defining a set of essential metadata fields in accordance with one embodiment of the invention. Display 300 can include listing 310 of metadata fields, and corresponding options 320 for each of the fields. A user can toggle options 320 to select the specific metadata fields to serve as essential fields for a device or for particular data. Listing 310 can include any suitable metadata field, including for example all of the fields, a default set of fields, or a subset of the fields. In some embodiments, a user can add fields to listing 310, for example by calling a secondary display or pop-up menu. In some implementations, a display 300 can be called up for each instance of data, for each type of data (e.g., based on a metadata type field, or based on a file type), or for each device used to capture or access data. In some embodiments, display 300 can include title 302 depicting the type of data or device to which the display corresponds.

Figure 4:
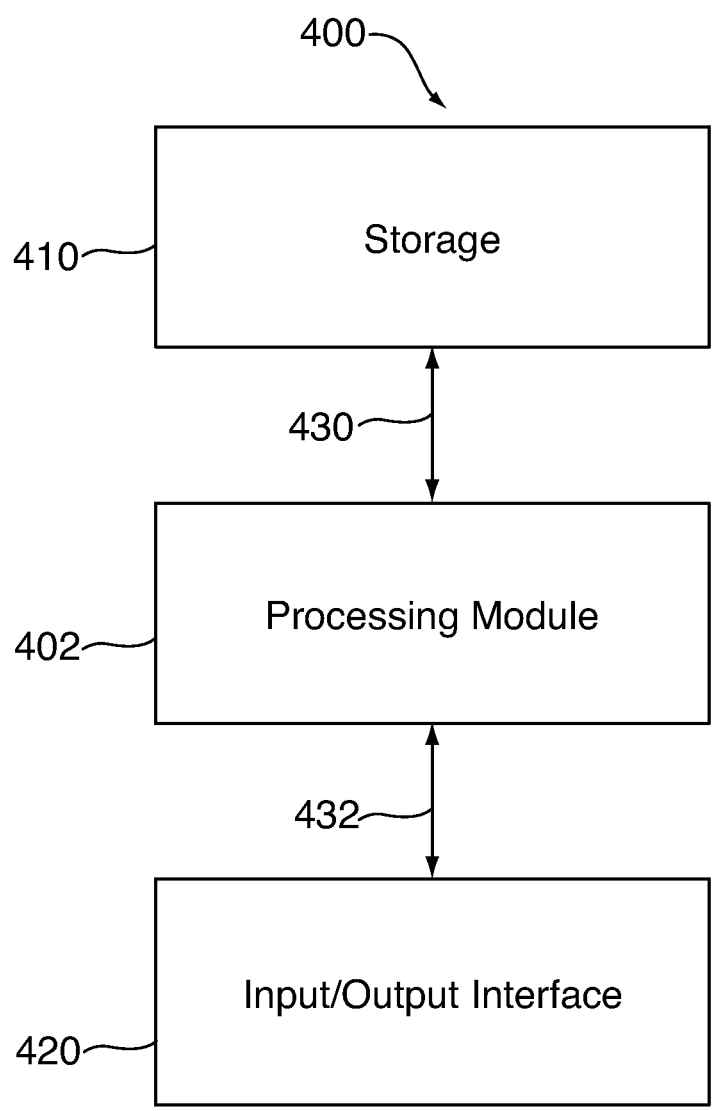
FIG. 4 is a schematic view of an illustrative system for managing metadata in accordance with one embodiment of the invention.

Any suitable component, process, or module of the electronic device can manage the association of metadata with data. FIG. 4 is a schematic view of an illustrative system for managing metadata in accordance with one embodiment of the invention. System 400 can include processing module 402 operative to control the association of metadata with data. For example, processing module 402 can define links or pointers between metadata and data. Processing module can be implemented as part of any suitable electronic device component, including for example as part of processing circuitry, memory, storage, or combinations of these. In some embodiments, processing module 402 can direct other electronic device components to perform one or more specific operations for retrieving metadata.

Processing module 402 can retrieve specific data from storage 410 via communications path 430. Storage 410 can include any suitable local or remote storage, including for example storage accessed over a network (e.g., web-based storage or storage provided as part of a social network). Communications path 430 can include a communications path over any suitable wired or wireless network. In some embodiments, the communications path can be selected based on communications circuitry available to the device.

In some embodiments, processing module 402 can receive specific instructions from a user regarding which metadata to associate with particular data. For example, a user can enter metadata associated with one or more specific fields. Processing module 402 can receive user instructions, and provide information to display (e.g., menus showing metadata for particular data) using input/output interface 420. Input/output interface 420 can include any suitable combination of hardware and software, including for example one or more displays, audio output interfaces, input interfaces, or combinations of these. In some embodiments, one or more elements of input/output interface 420 can be remote from the device of processing module 402. Processing module 402 can communicate with input/output interface 420 using communications path 432, which can have some or all of the properties of communications path 430.

While some of this metadata can be automatically generated by the device capturing the data or by a device used to access the data, some devices may not have the capabilities required to generate the metadata. In particular, some devices may not have the capabilities required for generating metadata in all of the essential fields corresponding to the data. It may therefore be desirable for a processing module to automatically add the metadata for at least the minimum or essential set of metadata fields (e.g., as defined by default or by the user using a display such as display 300, FIG. 3).

Once the electronic device has identified the essential metadata fields that are empty for particular data, or other metadata fields for which it would be desirable to acquire metadata to associate with data, the processing module can identify different sources from which to retrieve the metadata. In some embodiments, the processing module can go through a progression of sources for finding additional metadata. For example, the processing module can first look at information available from the user's electronic device or from other electronic devices used by the user. As another example, the processing module can connect to one or more social networks used by the user to retrieve information from the one or more social networks (e.g., from metadata associated with data provided by the user's friends on the social network). As still another example, the processing module can connect to one or more remote sources and search for other data that may be related to the particular data for which additional metadata is desired.

As a first step, a processing module can determine some attributes of data based on the available metadata. For the simplicity of the following discussion, the data will be captured video, though it will be understood that features of the description can apply to any other type of data. The processing module can review the available metadata provided with a video, and compare the available metadata with other information available to the electronic device to extract, from the other information, additional metadata for the video.

The processing module can extract additional metadata from any suitable application or application data of the device. For example, the processing module can determine a location and people who may be in the video from a calendar entry identified from date and time metadata. As another example, the processing module can analyze one or more frames of the video to detect faces, and compare the detected faces with known faces of a photo or video management application (e.g., iPhoto available from Apple Inc.). As still another example, the processing module can analyze one or more frames to detect a particular landmark, displayed text (e.g., part of a business card, a street sign, or a store sign), or other recognizable content. The detected text or landmark can be compared to addresses, business names, or contact information (e.g., telephone numbers) known to the device, for example from an address book or history of addresses entered in a mapping application (e.g., a map website). As still yet another example, the processing module can process and analyze audio in the video to extract voice prints that can be compared to a library of known voice prints associated with contacts of a user's address book.

Figure 5:
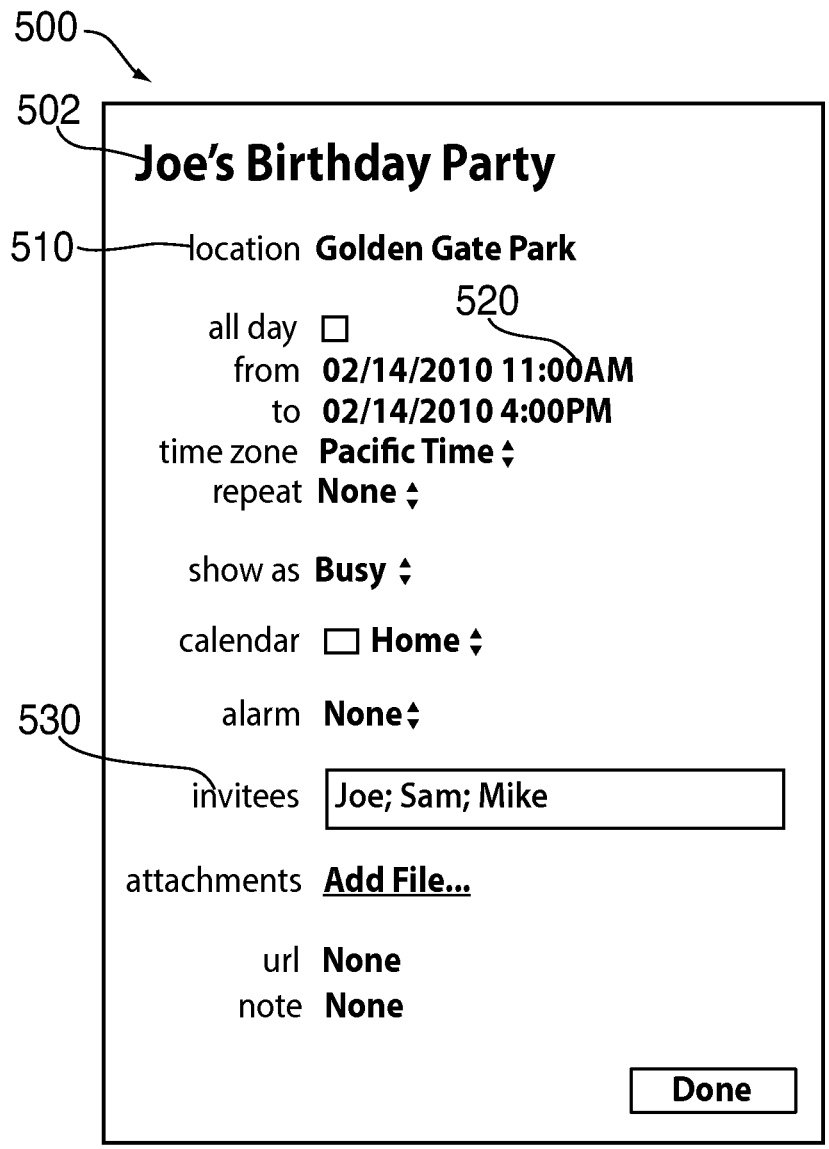
FIG. 5 is a schematic view of an illustrative calendar entry used for extracting metadata in accordance with one embodiment of the invention.

FIG. 5 is a schematic view of an illustrative calendar entry used for extracting metadata in accordance with one embodiment of the invention. Calendar entry 500 can include event title 502, location 510, and time 520. When the processing module determines that a captured video was created during or near time 520, the processing module can conclude that the captured video took place in the context of event 502. The processing module can then tag the video with the event title (which was not included as metadata when the video was captured) and the location (which may not have been included as metadata if the capturing device did not include positioning circuitry). In some embodiments, calendar entry 500 can include guests or invitees 530 indicating those present at the vent. For example, entry 500 can indicate that Joe, Sam and Mike were scheduled to attend, but that Vinnie and Jenn (not shown in invitee field 530) turned down the invitation to attend the event. The processing module can then tag the captured video with the names of Joe, Sam and Mike.

In some embodiments, the processing module can instead or in addition extract additional metadata by comparing the metadata of several captured videos. For example, the processing module can identify two distinct videos captured using different devices within a maximal interval (e.g., captured within a few hours of each other), where only one of the videos includes location information (e.g., due to the absence of location sensing circuitry in the other electronic device). The processing module can then apply the same location metadata to both of the videos. In some embodiments, the processing module can first determine whether a color profile of the videos is similar, whether a same voice is on both vides, or any other information to ensure that both videos were captured in the same general area.

Once the processing module has extracted metadata from the local resources available from one or more of the user's electronic devices (e.g., available from a cellular telephone, a communications device such as an iPad available from Apple Inc., and a notebook computer), the processing module can expand the search for metadata to one or more social networks. In particular, the processing module can identify one more social networks used by the user or by the user's friends, and review the data made available on the social networks. For example, the processing module can review feeds or other information provided by one or more of Facebook, flickr, yelp, 4-square, loopt, gowalla, twitter, linked-in, or other social networking, blogging, or micro-blogging service. The processing module can initially review the social networking streams of the user accessing or creating the data, and identify entries provided by the user that are within a time frame corresponding to the data. If one or more entries correspond to data, the electronic device can review the content of the entries, or metadata associated with the entries (e.g., location metadata) to extract additional metadata to associated with the data.

In some embodiments, the processing module can expand the review of social networking streams to identify streams associated with other people. In particular, the processing module can review streams associated with other people identified in the data (e.g., identified from the content of a captured video). For example, a processing module can retrieve the identity of a particular person from an image or video management application (e.g., a face detection output), retrieve a social networking handle associated with the identified person from an address book, and review one or more social networking streams associated with the retrieved handle. The processing module can then extract additional metadata from the content of one or more entries provided by the particular person. For example, the processing module can identify the name of another person present with the particular person from a social networking entry indicating who was present, and tag the video with both people's name.

Figure 6:
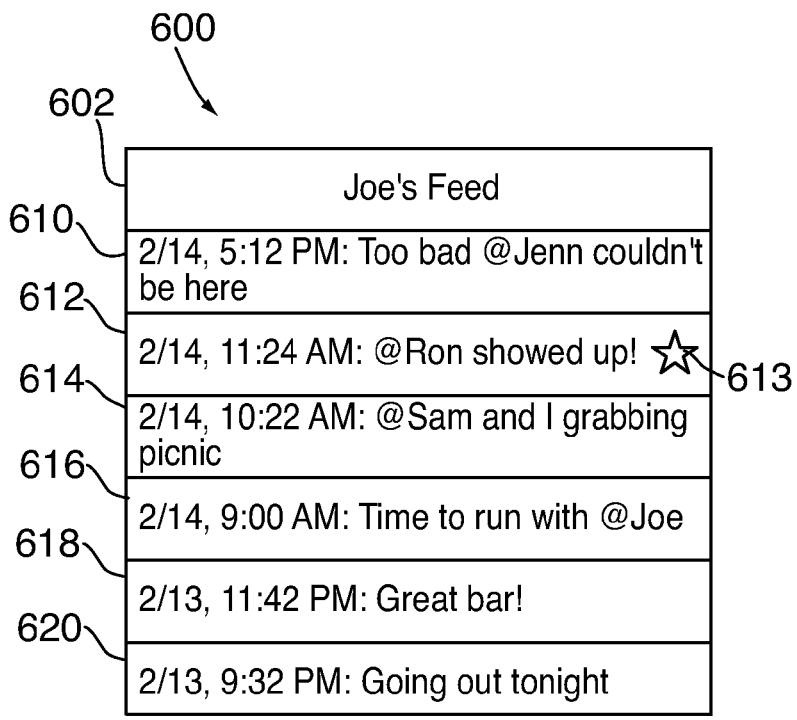
FIG. 6 is a schematic view of an illustrative social networking stream used to extract metadata for data in accordance with one embodiment of the invention.

FIG. 6 is a schematic view of an illustrative social networking stream used to extract metadata for data in accordance with one embodiment of the invention. Stream 600 can be associated with a particular person, for example a person identified in title bar 602 (e.g., Joe). In this example, stream 600 can be associated with another user who the processing module knows, from a calendar entry, was with the user during a calendar event. Stream 600 can include entries 610, 612, 614, 616, 618 and 620 corresponding to entries provided by Joe. Each entry can be tagged with a date and time, such that the processing module can review the stream and identify the particular entries that were provided during the calendar event (e.g., between 11 AM and 4 PM on February 14), as well as events that were provided within a duration before or after the event (e.g., 2 hours before and one and a half hours after). Using this criteria, the processing module can disregard entries 616, 618 and 620 as being outside of the time constraints.

The processing module can review entries 610, 612 and 614 to identify metadata from the entries. For example, the processing module can identify references to other people (e.g., @Sam, @Ron and @Jenn) as well as adjectives or verbs qualifying the references. In particular, the processing module can determine from entry 614 that Sam was at the event (consistent with the calendar entry), and from entry 612 that Ron attended as well (in contrast with the calendar entry). The processing module can also determine from entry 610 that Jenn did not attend the event (also consistent with the calendar entry). In some embodiments, one or more entries can include an image, video, audio, link to other content, or any other link for augmenting the entry. The additional content can be accessed by selecting a corresponding link, for example option 613. If the option is provided as part of a potentially relevant entry, the processing module can retrieve metadata associated with the content of the link (e.g., retrieve metadata associated with a photo of Ron at the event identified by option 613) and associate the metadata with the data.

To retrieve additional metadata, the processing module can crawl through several layers of social networking streams. Returning to the example of FIG. 6, the processing module can initially review the user's streams, then move to the streams of the user's friends within the social network that were identified in metadata for the data, such as Joe's stream. Subsequently, the processing module can review the streams of friends of Joe that were identified in relevant entries of Joe's stream (e.g., Ron and Sam's streams). The processing module can crawl through any suitable number of layers of social networking streams, including for example a fixed number, up to a maximum number, until particular metadata has been found for specific metadata fields, or combinations of these. In some embodiments, the processing module can limit the streams reviewed to those of people known or believed to be at the event (e.g., people identified from the calendar event, people mentioned in social networking streams, or people whose faces were detected in one or more videos or images, including images incorporated in social networking streams).

In some embodiments, the processing module can instead or in addition search for metadata from one or more remote sources. For example, the processing module can connect to a search engine and search for data related to particular metadata associated with a video. The processing module can use any metadata as a search term. In one implementation, the processing module can select some or all of the available metadata. For example, the processing module can use metadata that is known or expected to be accurate (e.g., metadata provided by the electronic device that captured the video). As another example, the processing module can use some metadata identified from the user's electronic devices (e.g., locally-identified metadata) or metadata identified from social networks used by the user. In some embodiments, the metadata retrieved from each source can have different priorities or weights.

For example, the processing module can analyze the content of a captured video and detect a specific color profile. In particular, the processing module can identify large amounts of orange corresponding to banners displayed in the known location (Golden Gate Park), or the processing module can identify a combination of purple and blue in the video corresponding to clothing worn by people at the event. The processing module can search one or more remote sources for other images from the same general location having similar color profiles, and retrieve metadata from those images. As another example, the processing module can provide a date and location to a search engine, and determine from the results that a particular event took place at that time and location (e.g., Valentine's day cook-off). The event information can be used as metadata for the captured video.

Once the processing module has retrieved metadata from some or all of the different sources (e.g., local, social network, and global sources), the processing module may need to manage the retrieved metadata to associate only the most relevant or most correct metadata with the captured video. In some embodiments, the processing module can provide only a single metadata value for each field (e.g., if the processing module identified adequate metadata for the essential metadata fields at the local level). In other embodiments, however, the processing module can determine that several different metadata is available for a single metadata field. In particular, some of the different metadata can be exclusive such that at least one instance of the different metadata is incorrect.

The processing module can determine which of several different metadata to associate with the captured video using any suitable approach. In some embodiments, the processing module can automatically select specific metadata for each metadata field. The processing module can use any suitable criteria for selecting particular metadata, including for example the number of times the particular metadata was extracted, the source (e.g., locally identified metadata has a higher priority that globally identified metadata), the delay between the time of capture and the time the metadata was identified (e.g., when the processing module extracted the metadata, or when the underlying data from which the metadata was extracted was published), previous sources from which metadata was extracted, the closeness of a source in a social network, or combinations of these. In some embodiments, the processing module can average several different metadata, or use any other operation to define a composite metadata from several different metadata.

Figure 7:
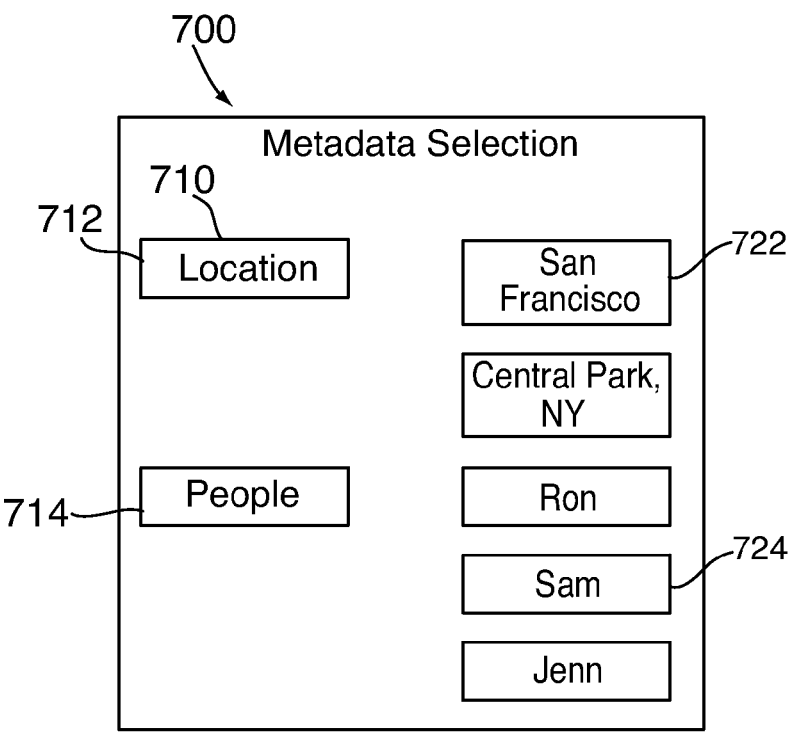
FIG. 7 is a schematic view of an illustrative display for selecting metadata to apply to a field in accordance with one embodiment of the invention.

In some embodiments, the processing module can provide some or all of the extracted metadata to the user for selection. For example, the processing module can provide extracted metadata for the essential metadata fields. As another example, the processing module can provide extracted metadata for fields where there are at least two or three different metadata. FIG. 7 is a schematic view of an illustrative display for selecting metadata to apply to a field in accordance with one embodiment of the invention. Display 700 can include listing 710 of metadata fields for which several different metadata are available. For example, listing 710 can include location field 712 and people field 714. Each field can be associated with several different metadata 722 and 724 respectively, from which a user can select one or more metadata (e.g., select several people that are present in the captured video). Once the user has selected one or more of the extracted metadata, the processing module can associate the selected metadata with the captured video.

In some embodiments, the metadata provided to the user in display 700 can include initially processed metadata (e.g., metadata pre-selected by the processing module). For example, the processing module can only present to the user the metadata having been identified in at least a threshold number of different sources, or in at least a source having threshold level of reliability. Display 700 can include an option for displaying more or the entirety of the extracted metadata if a user wishes to view all of the metadata.

In some embodiments, the processing module can repeat a particular search for metadata associated with a captured video at several different times. For example, the processing module can search for metadata each time the video is accessed or played back, at regular intervals, at varying intervals (e.g., intervals that increase), until particular metadata is identified (e.g., metadata for a particular field), until a user directs the processing module to stop, or until the processing module cannot find new metadata for the video.

Figure 8:
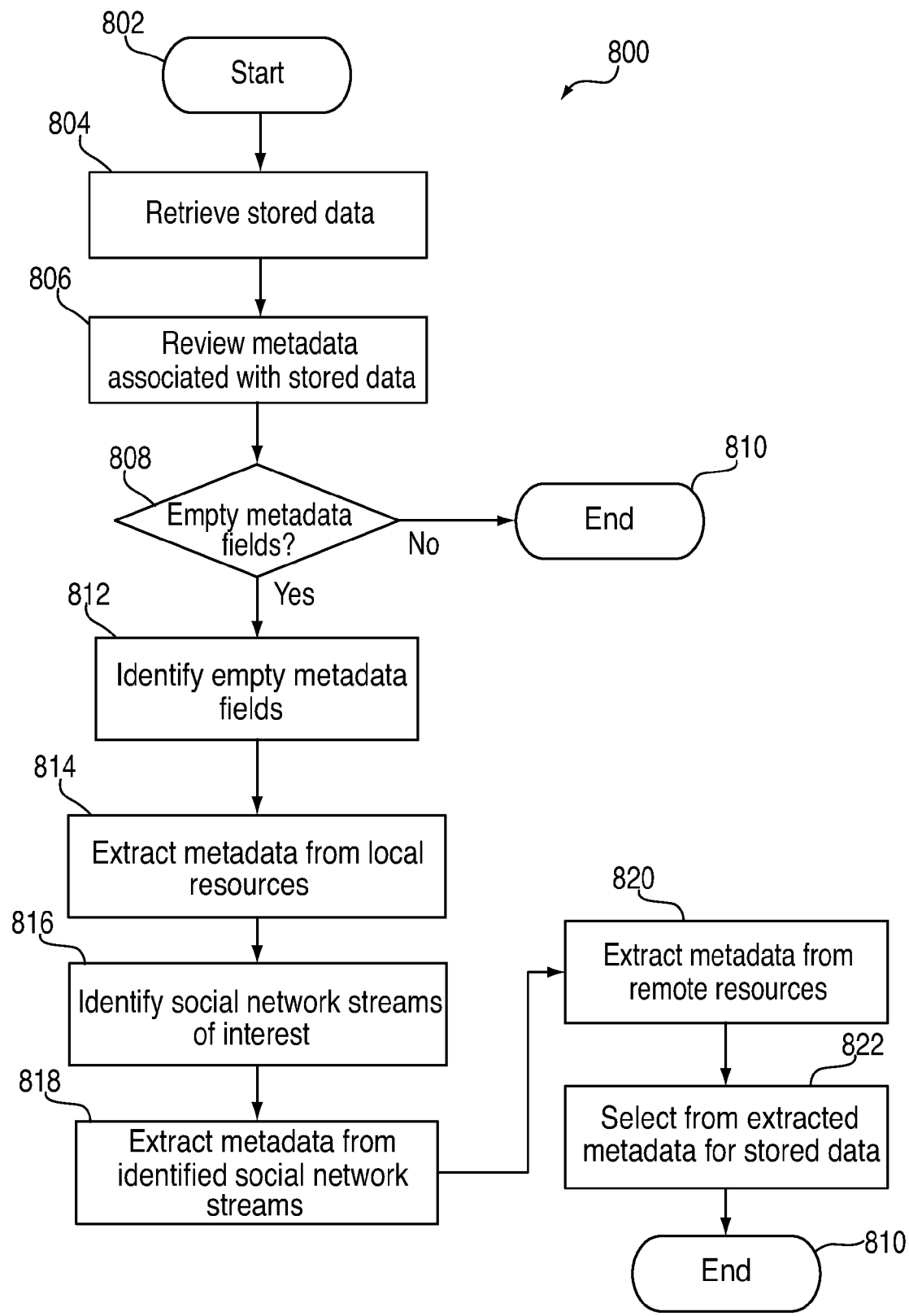
FIG. 8 is a flowchart of an illustrative process for automatically identifying metadata to associate with stored data in accordance with one embodiment of the invention.

FIG. 8 is a flowchart of an illustrative process for automatically identifying metadata to associate with stored data in accordance with one embodiment of the invention. Process 800 can begin at step 802. At step 804, a processing module can retrieve stored data. For example, a processing module can capture data. As another example, a processing module can retrieve data from storage (e.g., remote storage). At step 806, the processing module can review metadata associated with the stored data. For example, the processing module can retrieve metadata associated with the stored data, and determine whether metadata is stored in all of the metadata fields. At step 808, the processing module can determine whether there are empty metadata fields. For example, the processing module can determine whether one or more metadata fields do not have any metadata. In some embodiments, the processing module can instead determine whether essential, important or more relevant metadata fields include metadata. For example, the processing module can determine whether metadata is available for metadata fields associated with location, people and time. If the processing module determines that none of the metadata fields are empty, process 800 can move to step 810 and end.

If, at step 808, the processing module instead determines that there are empty metadata fields, process 800 can move to step 812. At step 812, the processing module can identify empty metadata fields. For example, the processing module can determine the specific metadata fields for which metadata is required. At step 814, the processing module can extract metadata from local resources. For example, the processing module can review applications and application data for applications available on a user's electronic device, and retrieve application data corresponding to available metadata associated with the stored data. For example, the processing module can identify a calendar event corresponding to a date and time at which an image was captured. The processing module can extract metadata from the application data corresponding to the stored data. In some embodiments, process 800 can move directly from step 814 to step 822.

At step 816, the processing module can identify social network streams of interest for the stored data. For example, the processing module can identify social network streams associated with the user that generated or is accessing the stored content. As another example, the processing module can identify social network streams associated with one or more people known or found to have been present when the stored data was generated (e.g., when a video was captured). At step 818, the processing module can extract metadata from the identified social network streams. For example, the processing module can review specific entries in the social network streams that correspond to the stored data, and extract metadata for the stored data from the specific entries. In some embodiments, process 800 can move directly from step 818 to step 822.

At step 820, the processing module can extract metadata from remote resources. For example, the processing module can use extracted or known metadata as search terms for additional resources available from a remote source (e.g., the Internet). The processing module can extract specific metadata from the additional resources. At step 822, the processing module can select from the extracted metadata to associate with the stored data. For example, the processing module can apply a weighing or averaging algorithm to select particular metadata. As another example, the processing module can prompt the user to select particular metadata. Process 800 can then end at step 810.

Figure 9:
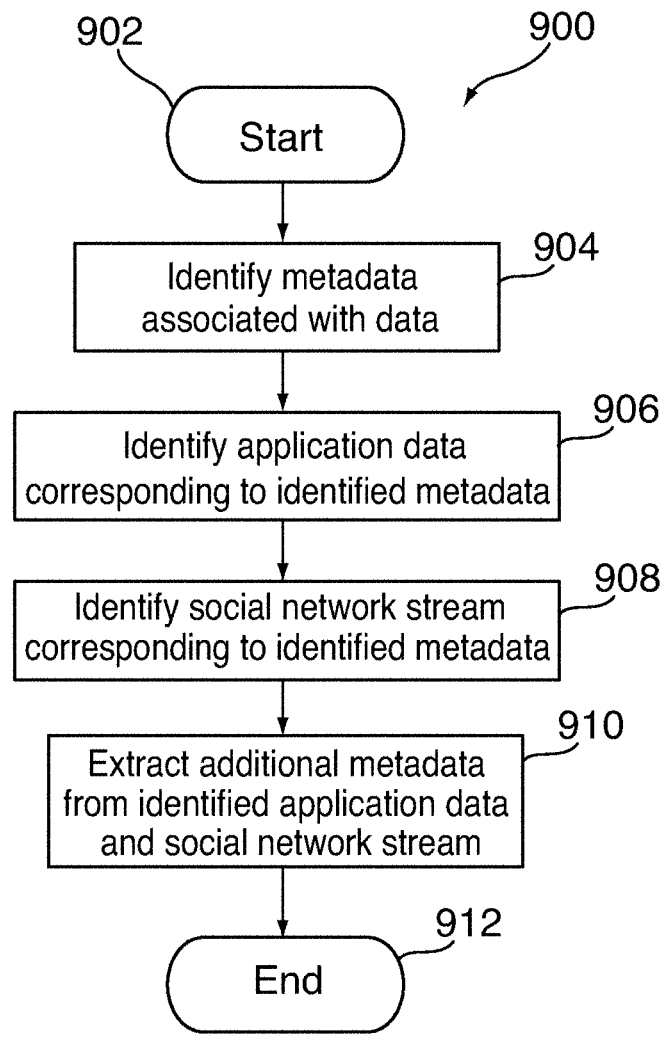
FIG. 9 is a flowchart of an illustrative process for associating additional metadata with data in accordance with one embodiment of the invention.

FIG. 9 is a flowchart of an illustrative process for associating additional metadata with data in accordance with one embodiment of the invention. Process 900 can begin at step 902. At step 904, a processing module can identify metadata associated with stored data. For example, the processing module can identify the particular metadata fields having metadata. In some embodiments, the processing module can determine that some metadata fields, including more important or more relevant metadata fields, do not include any metadata. At step 906, the processing module can identify application data of an electronic device that corresponds to identified metadata. For example, the processing module can review calendar, contact, and media information corresponding to the identified metadata.

At step 908, the processing module can identify one or more social network streams corresponding to the identified metadata. For example, the processing module can identify a social network stream provided by the user who captured or created the data. As another example, the processing module can identify a stream associated with a user that appears in the data (e.g., a user captured in an image). At step 910, the processing module can extract metadata from the identified application data and social network stream, and associate the extracted metadata with the data. For example, the processing module can extract metadata from a calendar entry. As another example, the processing module can review entries from the social network stream and extract metadata from the relevant entries. Process 900 can then end at step 912.

In some embodiments, an electronic device can instead or in addition be used to gather some or all data not created or owned by a user based on metadata associated with data created or owned by the user. In particular, the electronic device can connect to a remote source (e.g., directly or via a host device) to retrieve other data corresponding to the user's data. For example, a user can direct an electronic device to retrieve images and video that are similar to one or more images or video accessed or created by the user.

Figure 10:
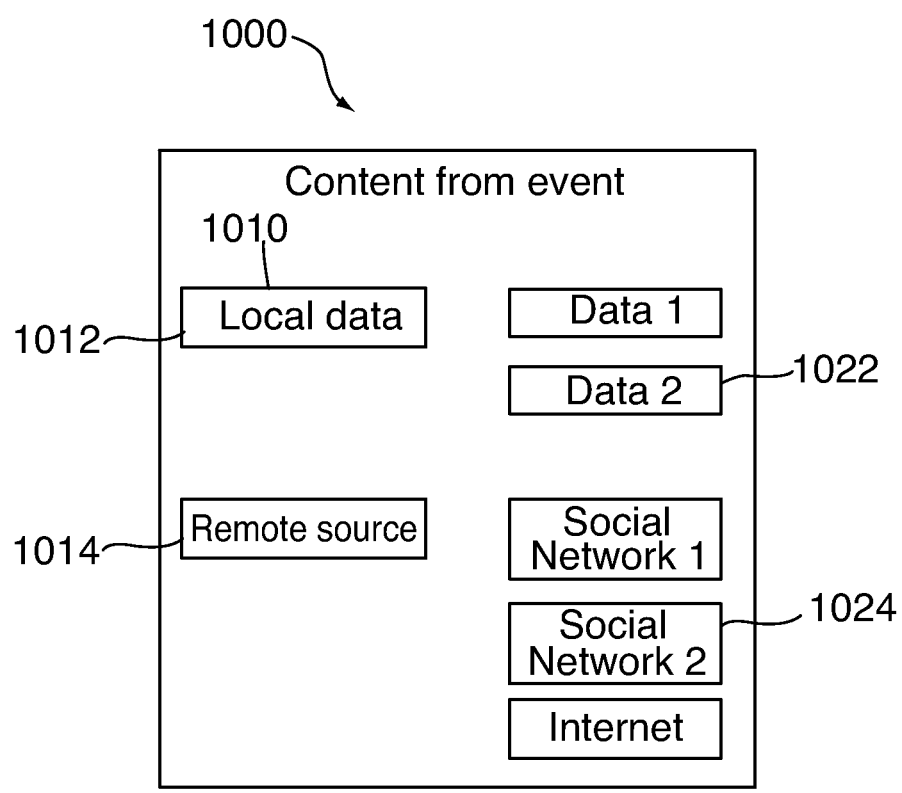
FIG. 10 is a schematic view of an illustrative display for identifying other data corresponding to selected data in accordance with one embodiment of the invention.

The electronic device can determine which data to gather from other sources using any suitable criteria. In some embodiments, the electronic device can identify other data based on metadata of similar data of interest owned by the user. FIG. 10 is a schematic view of an illustrative display for identifying other data corresponding to selected data in accordance with one embodiment of the invention. Display 1000 can include listing 1012 of local data owned or created by the user to serve as a search term. The user can select one or more instances of data 1022, including for example individual data items, collections of data (e.g., an event that includes several images and video clips), or combinations of these. In some embodiments, data 1022 can instead or in addition include specific metadata associated with data of interest. This approach can allow a user to select a subset of the metadata associate with particular data. In some embodiments, the electronic device can weigh or prioritize different metadata associated with the selected data (e.g., use a higher priority for metadata that is shared between the data 1022).

Display 1000 can include listing 1014 of sources of data to search. For example, display 1000 can include one or more sources 1024, including for example specific sources (e.g., a specific social network, or a specific social network stream corresponding to a particular person), or more general sources (e.g., the Internet as a whole). The user can select one or more sources using any suitable approach, including for example by selecting sources from a list, or by entering information identifying a specific source.

In some embodiments, display 1000 can include one or more options for specifying the type of data to retrieve from the remote sources. For example, display 1000 can include an option defining a data type (e.g., media or images). In some embodiments, the display can include one or more options for limiting the scope of the retrieved data. For example, the display can include an option requiring retrieved data to have been generated or captured within a particular time period (e.g., during an event). As another example, the display can include an option for requiring that the data include specific content (e.g., retrieve all images that show the user and another person).

Figure 11:
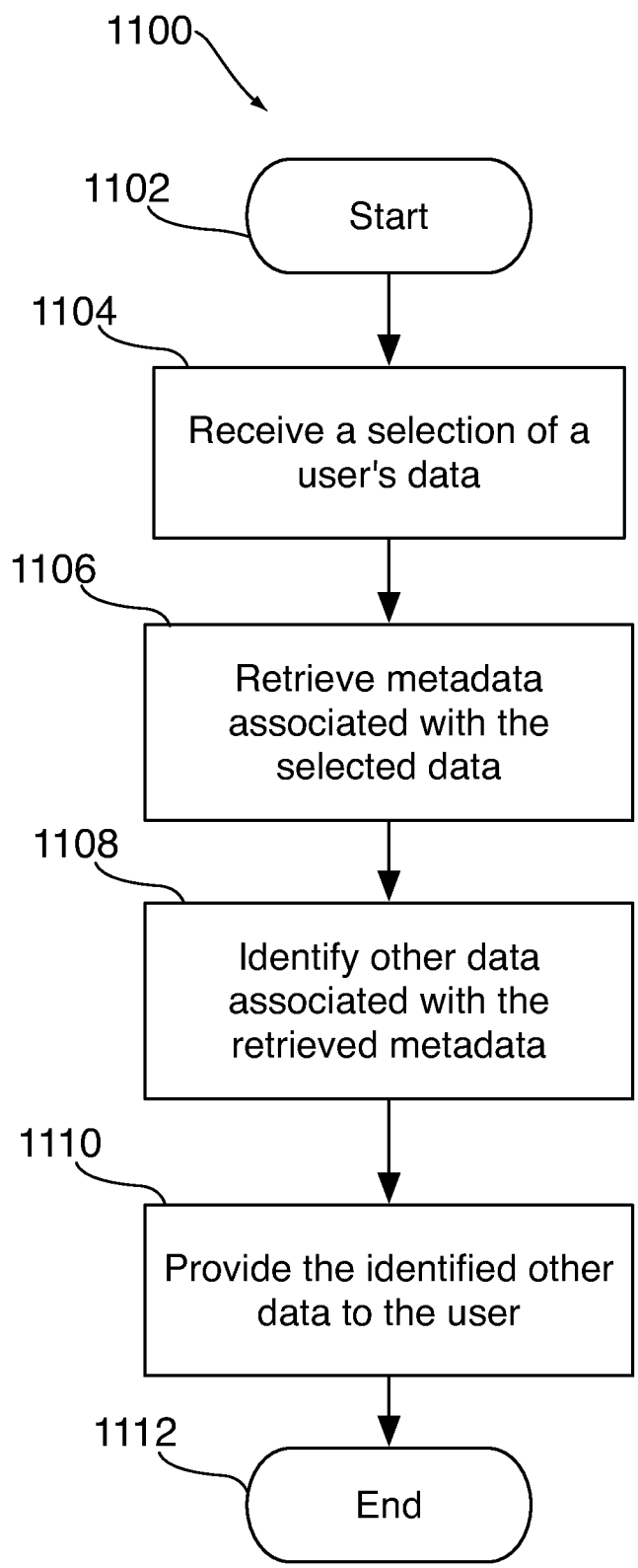
FIG. 11 is a flowchart of an illustrative process for compiling data from disparate sources to provide a comprehensive collection of data corresponding to an event in accordance with one embodiment of the invention.

Once the user has defined the search parameters, the electronic device can connect to a remote source and identify data that corresponds to the search terms. For example, the electronic device can retrieve, from the Internet, all images and video that were captured in Golden Gate Park during the birthday event shown in FIG. 5. By retrieving images and video captured by other people unknown to the user (e.g., not in the user's social networks), the user can review additional images that may show some or all of the user's event. This can allow the user to define and share a master or global catalogue of data for an event FIG. 11 is a flowchart of an illustrative process for compiling data from disparate sources to provide a comprehensive collection of data corresponding to an event in accordance with one embodiment of the invention. Process 1100 can begin at step 1102. At step 1104, the electronic device can receive a selection of a user's data. For example, the electronic device can receive a selection of one or more instances of data. As another example, the electronic device can receive a selection of particular metadata. At step 1106, the electronic device can retrieve metadata associated with the selected data. For example, a processing module can provide a listing of metadata associated with the selected data. The electronic device can process the retrieved metadata to identify the most relevant metadata, or the most common metadata for the identified data. In some embodiments, step 1106 can be skipped if metadata is provided directly at step 1104.

At step 1108, the electronic device can identify other data associated with the retrieved metadata. For example, the electronic device can perform a search on one or more remote sources for data that is also associated with the retrieved metadata. The remote sources can include, for example, a social network, a blogging or micro-blogging network, the Internet, or combinations of these. In some embodiments, the electronic device can identify specific types of data to retrieve (e.g., only retrieve images or video). For example, the electronic device can retrieve data that is of the same type as the user selected data. At step 1110, the identified other data can be provided to the user. For example, the electronic device can provide a display having a listing of identified data originating from other users. Process 1100 can end at step 1112.

Figure 12:
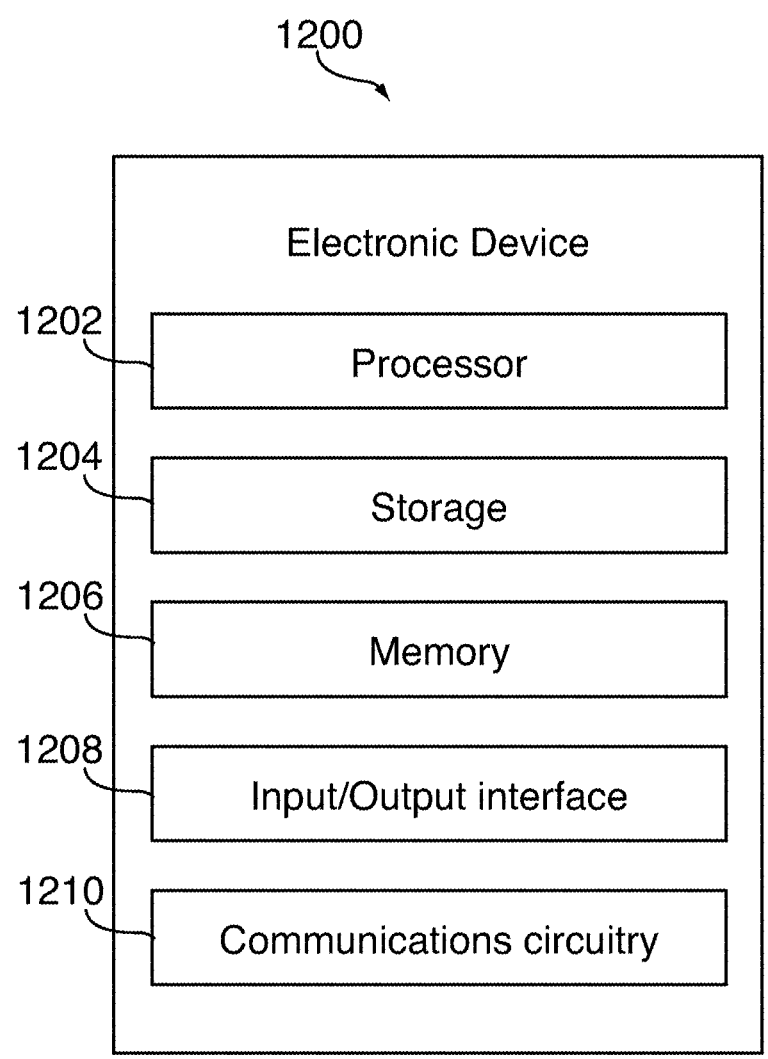
FIG. 12 is a schematic view of an illustrative electronic device for playing back media in accordance with one embodiment of the invention.

The electronic device used to perform some or all of the features described above can include any suitable combination of hardware, firmware and software for performing offline transactions. FIG. 12 is a schematic view of an illustrative electronic device for playing back media in accordance with one embodiment of the invention. Electronic device 1200 can include any suitable type of electronic device operative to play back media items. For example, electronic device 1200 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a desktop computer, a music recorder, a video recorder, a camera, radios, medical equipment, and any other device capable of playing back media items.

Electronic device 1200 may include processor 1202, storage 1204, memory 1206, input/output interface 1208, and communications circuitry 1210. In some embodiments, one or more of electronic device components 1200 may be combined or omitted (e.g., combine storage 1204 and memory 1206). In some embodiments, electronic device 1200 may include other components not combined or included in those shown in FIG. 12 (e.g., location circuitry, sensing circuitry detecting the device environment, a power supply, or a bus), or several instances of the components shown in FIG. 12. For the sake of simplicity, only one of each of the components is shown in FIG. 12.

Processor 1202 may include any processing circuitry or control circuitry operative to control the operations and performance of electronic device 1200. For example, processor 1202 may be used to run operating system applications, firmware applications, media playback applications, media editing applications, or any other application. In some embodiments, a processor may drive a display and process inputs received from a user interface.

Storage 1204 may include, for example, one or more storage mediums including a hard-drive, solid state drive, flash memory, permanent memory such as ROM, any other suitable type of storage component, or any combination thereof. Storage 1204 may store, for example, media data (e.g., music and video files), application data (e.g., for implementing functions on device 1200), firmware, user preference information (e.g., media playback preferences), authentication information (e.g. libraries of data associated with authorized users), lifestyle information (e.g., food preferences), exercise information (e.g., information obtained by exercise monitoring equipment), transaction information (e.g., information such as credit card information), wireless connection information (e.g., information that may enable electronic device 1200 to establish a wireless connection), subscription information (e.g., information that keeps track of podcasts or television shows or other media a user subscribes to), contact information (e.g., telephone numbers and email addresses), calendar information, and any other suitable data or any combination thereof.

Memory 1206 can include cache memory, semi-permanent memory such as RAM, and/or one or more different types of memory used for temporarily storing data. In some embodiments, memory 1206 can also be used for storing data used to operate electronic device applications, or any other type of data that may be stored in storage 1204. In some embodiments, memory 1206 and storage 1204 may be combined as a single storage medium.

Input/output interface 1208 may provide inputs to input/output circuitry of the electronic device. Input/output interface 1208 may include any suitable input interface, such as for example, a button, keypad, dial, a click wheel, or a touch screen. In some embodiments, electronic device 1200 may include a capacitive sensing mechanism, or a multi-touch capacitive sensing mechanism. In some embodiments, input interface can include a microphone or other audio input interface for receiving a user's voice inputs. The input interface can include an analog to digital converter for converting received analog signals corresponding to a voice input to a digital signal that can be processed and analyzed to identify specific words or instructions.

In some embodiments, input/output interface 1208 can instead or in addition include one or more interfaces for providing an audio output, visual output, or other type of output (e.g., odor, taste or haptic output). For example, input/output interface 1208 can include one or more speakers (e.g., mono or stereo speakers) built into electronic device 1200, or an audio connector (e.g., an audio jack or an appropriate Bluetooth connection) operative to be coupled to an audio output mechanism. Input/output interface 1208 may be operative to provide audio data using a wired or wireless connection to a headset, headphones or earbuds. As another example, input/output interface 1208 can include display circuitry (e.g., a screen or projection system) for providing a display visible to the user. The display can include a screen (e.g., an LCD screen) that is incorporated in electronic device 1200, a movable display or a projecting system for providing a display of content on a surface remote from electronic device 1200 (e.g., a video projector), or any other suitable display. Input/output interface 1208 can interface with the input/output circuitry (not shown) to provide outputs to a user of the device.

Communications circuitry 1210 can be operative to create or connect to a communications network. Communications circuitry 1210 can be capable of providing wireless communications using any suitable short-range or long-range communications protocol. For example, communications circuitry 1210 can support Wi-Fi (e.g., a 802.11 protocol), Bluetooth (registered trademark), radio frequency systems (e.g., 1200 MHz, 2.4 GHz, and 5.6 GHz communication systems), infrared, protocols used by wireless and cellular phones and personal email devices, or any other protocol supporting wireless communications. Communications circuitry 1210 may instead or in addition be capable of providing wired communications, for example using any suitable port on one or both of the devices (e.g., 30-pin, USB, FireWire, Serial, or Ethernet).

In some embodiments, electronic device 1200 may include a bus operative to provide a data transfer path for transferring data to, from, or between control processor 1202, storage 1204, memory 1206, input/output interface 1208, communications circuitry 1210, and any other component included in the electronic device.

Although many of the embodiments of the present invention are described herein with respect to personal computing devices, it should be understood that the present invention is not limited to personal computing applications, but is generally applicable to other applications.

Embodiments of the invention are preferably implemented by software, but can also be implemented in hardware or a combination of hardware and software. Embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. An electronic device for automatically retrieving metadata to apply to a media item, comprising a processor, storage, and communications circuitry, the processor operative to:
    retrieve the media item from the storage;
    identify initial metadata associated with the media item;
    identify a calendar entry associated with the media item, the calendar entry associated with a date and a time;
    direct the communications circuitry to identify social network entries corresponding to the initial metadata that are within a predetermined time period of the date and the time of the calendar entry;
    extract additional metadata from the social network entries, wherein the additional metadata was not previously associated with the media item;
    determine whether the additional metadata meets one or more association criteria;
    in accordance with a determination that the additional metadata meets the one or more association criteria, associate the additional metadata with the media item; and
    in accordance with a determination that the additional metadata does not meet the one or more association criteria, forgo the association of the additional metadata with the media item.

2. The electronic device of claim 1, wherein the processor is further operative to:
    determine at least one metadata category for the extracted additional metadata; and
    associate the extracted additional metadata with the at least one metadata category.

3. The electronic device of claim 2, wherein the processor is further operative to:
    determine that the additional metadata comprises different metadata for the at least one metadata category; and
    select one of the different metadata for the at least one metadata category.

4. The electronic device of claim 3, wherein the processor is further operative to:
    apply a weighing scheme to select the one of the different metadata.

5. The non-transitory computer readable storage medium of claim 3, wherein the instructions, when executed by the electronic device, further cause the device to:
    apply a weighing scheme to select the one of the different metadata.

6. The electronic device of claim 1, wherein the additional metadata comprises at least one person's identity.

7. The electronic device of claim 1, wherein the processor is further operative to:
    identify one or more people associated with the calendar entry,
    wherein identifying the social network entries comprises identifying social network entries associated with the one or more people.

8. A method for defining a collection of data related to a user's data, comprising:
    displaying:
        one or more representations of the user's data; and
        one or more representations of remote sources;
    while displaying the one or more representations of the user's data and the one or more representations of the remote sources, receiving selection of:
        at least one of the representations of the user's data; and
        at least one of the representations of the remote sources;
    retrieving metadata associated with the selected user's data;
    identifying other data from the selected remote sources based on the retrieved metadata, wherein the other data was not previously associated with the selected user's data;
    determining whether the other data from the selected remote sources meets one or more association criteria;
    in accordance with a determination that the other data meets the one or more association criteria, providing the other data to the user; and
    in accordance with a determination that the other data does not meet the one or more association criteria, forgoing providing the other data to the user.

9. The method of claim 8 wherein:
receiving the selection of the at least one of the representations of the user's data comprises receiving a selection of a plurality of different data, and
retrieving the metadata associated with the selected user's data comprises retrieving metadata associated with each of the plurality of different data,
the method further comprising defining a set of common metadata for the plurality of different data.

10. The method of claim 8, further comprising:
receiving non-metadata based search criteria; and
identifying other data associated with the retrieved metadata and satisfying the received non-metadata-based search criteria.

11. The method of claim 10, wherein the non-metadata based search criteria comprises at least one of:
a time period;
required content of the data; and
association with a specific person.

12. A non-transitory computer readable storage medium storing one or more programs, the one or more programs comprising instructions, which when executed by an electronic device with a processor, storage, and communications circuitry, cause the device to:
retrieve a media item from the storage;
identify initial metadata associated with the media item;
identify a calendar entry associated with the media item, the calendar entry associated with a date and a time;
direct the communications circuitry to identify social network entries corresponding to the initial metadata that are within a predetermined time period of the date and the time of the calendar entry;
extract additional metadata from the social network entries, wherein the additional metadata was not previously associated with the media item;
determine whether the additional metadata meets one or more association criteria;
in accordance with a determination that the additional metadata meets the one or more association criteria, associate the additional metadata with the media item; and
in accordance with a determination that the additional metadata does not meet the one or more association criteria, forgo the association of the additional metadata with the media item.

13. The non-transitory computer readable storage medium of claim 12, wherein the instructions, when executed by the electronic device, further cause the device to:
determine at least one metadata category for the extracted additional metadata; and
associate the extracted additional metadata with the at least one metadata category.

14. The non-transitory computer readable storage medium of claim 13, wherein the instructions, when executed by the electronic device, further cause the device to:
determine that the additional metadata comprises different metadata for the at least one metadata category; and
select one of the different metadata for the at least one metadata category.

15. The non-transitory computer readable storage medium of claim 12, wherein the additional metadata comprises at least one person's identity.

16. The non-transitory computer readable storage medium of claim 12, wherein the instructions, when executed by the electronic device, further cause the device to:
identify one or more people associated with the calendar entry,
wherein identifying the social network entries comprises identifying social network entries associated with the one or more people.

17. A method for automatically retrieving metadata to apply to a media item, the method comprising:
retrieving the media item from storage;
identifying initial metadata associated with the media item;
identifying a calendar entry associated with the media item, the calendar entry associated with a date and a time;
identifying social network entries corresponding to the initial metadata that are within a predetermined time period of the date and the time of the calendar entry;
extracting additional metadata from the social network entries, wherein the additional metadata was not previously associated with the media item;
determining whether the additional metadata meets one or more association criteria;
in accordance with a determination that the additional metadata meets the one or more association criteria, associating the additional metadata with the media item; and
in accordance with a determination that the additional metadata does not meet the one or more association criteria, forgoing the association of the additional metadata with the media item.

18. The method of claim 17, further comprising:
determining at least one metadata category for the extracted additional metadata; and
associating the extracted additional metadata with the at least one metadata category.

19. The method of claim 18, further comprising:
determining that the additional metadata comprises different metadata for the at least one metadata category; and
selecting one of the different metadata for the at least one metadata category.

20. The method of claim 19, further comprising:
apply a weighing scheme to select the one of the different metadata.

21. The method of claim 17, wherein the additional metadata comprises at least one person's identity.

22. The method of claim 17, further comprising:
identifying one or more people associated with the calendar entry,
wherein identifying the social network entries comprises identifying social network entries associated with the one or more people.

23. An electronic device for defining a collection of data related to a user's data, comprising a processor, storage, and communications circuitry, the processor operative to:
display:
one or more representations of the user's data; and
one or more representations of remote sources;
while displaying the one or more representations of the user's data and the one or more representations of the remote sources, receive selection of:
at least one of the representations of the user's data; and
at least one of the representations of the remote sources;
retrieve, from the storage, metadata associated with the selected user's data;
direct the communications circuitry to identify other data from the selected remote sources based on the retrieved metadata, wherein the other data was not previously associated with the selected user's data;
determine whether the other data from the selected remote sources meets one or more association criteria;

in accordance with a determination that the other data meets the one or more association criteria, provide the other data to the user; and in accordance with a determination that the other data does not meet the one or more association criteria, forgo providing the other data to the user.

24. The electronic device of claim 23 wherein:

receiving the selection of the at least one of the representations of the user's data comprises receiving a selection of a plurality of different data, and retrieving the metadata associated with the selected user's data comprises retrieving metadata associated with each of the plurality of different data, the processor further operative to define a set of common metadata for the plurality of different data.

25. The electronic device of claim 23, the processor further operative to:

receive non-metadata based search criteria; and identify other data associated with the retrieved metadata and satisfying the received non-metadata-based search criteria.

26. The electronic device of claim 25, wherein the non-metadata based search criteria comprises at least one of:

a time period;
required content of the data; and
association with a specific person.

27. A non-transitory computer readable storage medium storing one or more programs, the one or more programs comprising instructions, which when executed by an electronic device with a processor, storage, and communications circuitry, cause the device to:

display:
one or more representations of the user's data; and
one or more representations of remote sources;

while displaying the one or more representations of the user's data and the one or more representations of the remote sources, receive selection of:
at least one of the representations of the user's data; and
at least one of the representations of the remote sources;

retrieve, from the storage, metadata associated with the selected user's data;

direct the communications circuitry to identify other data from the selected remote sources based on the retrieved metadata, wherein the other data was not previously associated with the selected user's data;

determine whether the other data from the selected remote sources meets one or more association criteria;

in accordance with a determination that the other data meets the one or more association criteria, provide the other data to the user; and in accordance with a determination that the other data does not meet the one or more association criteria, forgo providing the other data to the user.

28. The non-transitory computer readable storage medium of claim 27 wherein:

receiving the selection of the at least one of the representations of the user's data comprises receiving a selection of a plurality of different data, and retrieving the metadata associated with the selected user's data comprises retrieving metadata associated with each of the plurality of different data, the instructions, when executed by the electronic device, further cause the device to define a set of common metadata for the plurality of different data.

29. The non-transitory computer readable storage medium of claim 27, wherein the instructions, when executed by the electronic device, further cause the device to:

receive non-metadata based search criteria; and identify other data associated with the retrieved metadata and satisfying the received non-metadata-based search criteria.

30. The non-transitory computer readable storage medium of claim 29, wherein the non-metadata based search criteria comprises at least one of:

a time period;
required content of the data; and
association with a specific person.

* * * * *